United States Patent [19]

Meyer

[11] 4,283,121
[45] Aug. 11, 1981

[54] ELECTROLYTIC DISPLAY CELLS WITH A METAL DEPOSIT

[75] Inventor: Robert Meyer, Saint Ismier, France

[73] Assignee: Commissariat l'Energie, Paris, France

[21] Appl. No.: 51,031

[22] Filed: Jun. 22, 1979

[30] Foreign Application Priority Data

Jun. 30, 1978 [FR] France .............................. 78 19621

[51] Int. Cl.³ ............................................. G02F 1/29
[52] U.S. Cl. ..................................... 350/363; 350/357
[58] Field of Search ................................. 350/363, 357

[56] References Cited

U.S. PATENT DOCUMENTS

| 4,088,392 | 5/1978 | Meyers ................................. 350/357 |
| 4,199,228 | 4/1980 | Destannes et al. .................. 350/363 |

FOREIGN PATENT DOCUMENTS 1002809  9/1965  United Kingdom .

OTHER PUBLICATIONS

"Alphanumeric Electrochemical Display" by Zechman, *IBM Tech. Disclosure Bull.*, vol. 14, No. 1, Jun. '71.

*Primary Examiner*—William L. Sikes
*Assistant Examiner*—Léon Scott, Jr.

[57] ABSTRACT

Electrolytic display cell of the type comprising a transparent electrode of shape suitable for display purposes, a counter-electrode made from metal, called primary metal, an electrolyte inserted between the electrode and the counter-electrode, and means for supplying the electrode and counter-electrode with electric power so as to bring about in certain parts of the electrode the deposition or dissolving of a metal coating formed from the primary metal, wherein the counter-electrode is continuous and also comprises an electricity conducting material, which is chemically and electrochemically inert under the operating conditions of the cell, the said material and the said metal being associated in the counter-electrode in such a way that the primary metal is in contact with the electrolyte and the electricity conducting material forms a continuous film.

8 Claims, 1 Drawing Figure

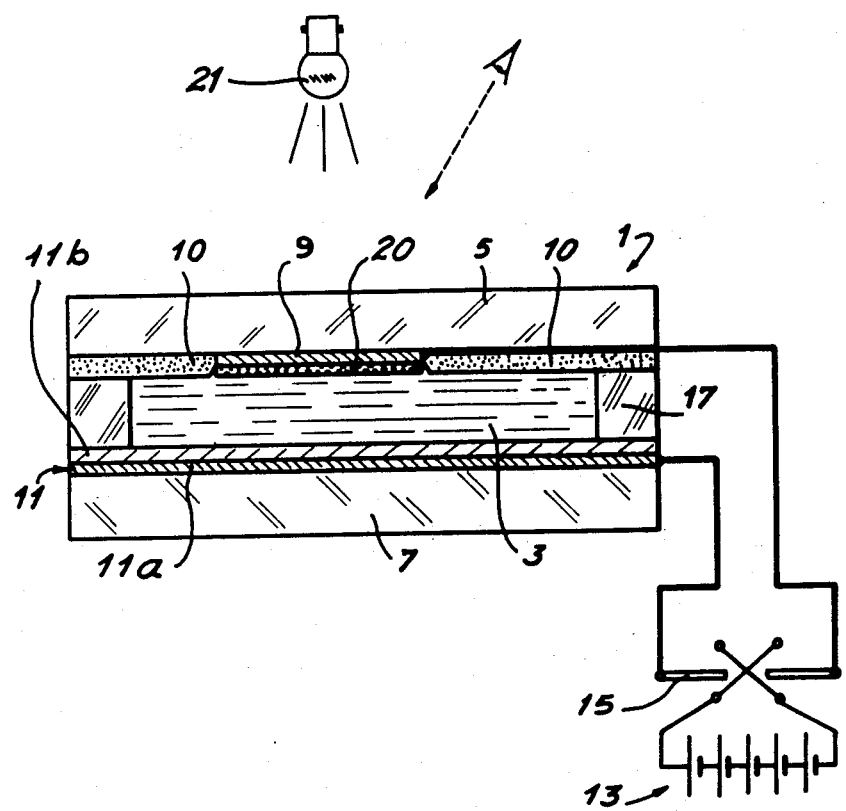

ELECTROLYTIC DISPLAY CELLS WITH A METAL DEPOSIT

BACKGROUND OF THE INVENTION

The present invention relates to an electrolytic display cell with a metal deposit and more specifically to a counter-electrode construction for a cell of this type.

The presently known metal deposit electrolytic display cells generally comprise a transparent electrode of a form suitable for display purposes, a metal counter-electrode, an electrolyte placed between the said electrode and the said counter-electrode and means for supplying electric power to the electrode and counter-electrode in such a way as to cause the deposition or dissolving of a metal coating formed from the counter-eelectrode metal on certain parts of the electrode.

In liquid electrolyte cells of this type the counter-electrode conventionally comprises a more or less thick metal coating, for example a sliver coating deposited on an inert insulating support such as a sheet of glass and the display is obtained by bringing about on certain parts of the electrode the deposition of a coating of the metal constituting the counter-electrode, for example a silver coating, whose optical properties (reflection, absorption) will lead to the production of a symbol (character, curve, segment, etc.).

The counter-electrodes used in such cells have the disadvantage of suffering a certain deterioration during the operation of the cell, which leads to a deterioration of the appearance of the display and makes the cell virtually unusable after a limited time, generally corresponding to approximately $10^5$ switching cycles.

Thus, the operation of such a metal deposit electrolytic display cell is based on the electrochemical reaction:

$$M \rightleftarrows M^{n+} + ne^-$$

in which M represents the metal of valence n which forms the metal deposit.

However, this reaction is not completely symmetrical, because the deposit corresponding to the reaction $M^n + ne^- \rightarrow M$ has an over voltage $\eta_c$ greater than the over voltage $\eta_a$ which characterises the reverse reaction $M \rightarrow M^{n+} + ne^-$ corresponding to the dissolving of the deposit of metal M.

Further, as in an electrolytic display cell, the counter-electrode surface is very large compared with that of the active electrode which has a configuration suitable for display purposes and as a result during the display the counter-electrode metal is dissolved in a preferred manner on those parts of the counter-electrode facing those parts of the electrode used for display purposes whilst, during the erasure, metal M tends to be redeposited on a much larger surface of the counter-electrode, which in the long-term leads to a metal impoverishment or reduction in certain parts of the counter-electrode.

When the counter-electrode metal film is relatively thin, for example of the order of a few dozens microns, the impoverishment phenomenon can lead to the complete disappearance of the film in certain areas. In this case, during the display, the deposition of metal on the active electrode can only occur on the edges of the parts intended for display purposes, so that the appearance of the display becomes inhomogeneous and unacceptable and the cell is unusable.

To obviate this disadvantage consideration has been given to increasing the thickness of the metal coating constituting the counter-electrode, but this solution is relatively unsatisfactory because it requires a large quantity of metal, which raises in a by no means negligible manner the cost of the cell, particularly when the metal is silver.

Moreover an electrooptical display device with a solid electrolyte is known (French Pat. No. 2 260 167) in which a metal counter-electrode is partly covered with insulent as the electrode and thus has a shape complimentary to that of the electrode. In such a device, during erasure, the metal deposited on the electrode from the counter-electrode cannot be redeposited on a larger surface of the counter-electrode, so that there is no risk of an impoverishment of the metal in certain parts of the counter electrode.

However, this solution has the disadvantage of requiring, during the assembly of the cell, of the perfect coincidence between the motifs of the counter-electrode and the corresponding motifs of the electrode, which leads to certain difficulties.

French Pat. No. 1 435 521 also discloses a light control device constituted by an electrolyte inserted between a continuous electrode and a metal particle-generating counter-electrode which is constituted for example by a cadmium-covered platinum wire. In this device the application of a potential difference makes it possible to gradually deposit metal particles over the complete electrode surface. On erasure all these metal particles return to the electrode, so that there can be no impoverishment of the metal of the counter-electrode.

BRIEF SUMMARY OF THE INVENTION

The present invention has for its object an electrolytic display cell in which the counter-electrode is continuous and has a special construction which makes it possible to prevent in the course of time a metal impoverishment of certain areas of the counter-electrode.

The invention therefore relates to an electrolytic display cell of the type comprising a transparent electrode of shape suitable for display purposes, a counter-electrode made from metal, called primary metal, an electrolyte inserted between the electrode and the counter-electrode, and means for supplying the electrode and counter-electrode with electric power so as to bring about in certain parts of the electrode the deposition or dissolving of a metal coating formed from the primary metal, wherein the counter-electrode is continuous and also comprises an electricity conducting material, which is chemically and electrochemically inert under the operating conditions of the cell, the said material and the said metal being associated in the counter-electrode in such a way that the primary metal is in contact with the electrolyte and the electricity conducting material forms a continuous film.

The electrolytic display cell as defined hereinbefore takes advantage of the fact that by using a continuous counter-electrode comprising not only the primary metal which participates in the electrochemical reaction of depositing the metal coating, but also a continuous film of another electricity conducting material, which is chemically and electrochemically inert under the operating conditions of said cell, the service life of the cell is improved by preventing metal impoverishment of the counter-electrode leading to an interruption of electric contact in certain areas of the counter-electrode.

Thus, although during the display, the counter-electrode metal is also dissolved in preferred manner on the parts of the counter-electrode facing the parts of the electrode used for display purposes and although this phenomenon may possibly lead to the disappearance of metal in certain parts of the counter-electrode, it can be redeposited on these parts, during erasure, in view of the fact that electric contact is not lost due to the presence of the electricity conducting material film. Thus, an equilibrium profile is obtained which makes it possible to increase the service life of the cell.

According to the invention it is indispensible that the electricity conducting material is chemically and electrochemically inert under the operating conditions of the cell, i.e. there must be no reaction with the electrolyte or with the primary metal of the counter-electrode, more specifically under the action of the voltages applied between the electrodes, in order to prevent the disappearance of the electricity conducting material film.

As examples of materials which can be used reference is in particular made to a secondary metal having an oxidation reduction potential which is greater than that of the primary metal of the counter electrode. When the primary metal is silver the conducting material is advantageously constituted by a precious metal such as palladium, gold or platinum.

According to a first embodiment of the counter-electrode of the cell according to the invention the primary metal and the electricity conducting material are associated in the counter-electrode in such a way as to form two superimposed layers constituted respectively by a first layer of the electricity conducting material and a second layer of the primary metal, the second layer of the primary metal being in contact with the electrolyte.

In this embodiment the layers are advantageously disposed on a support made from an electrically insulating material, the first layer being in contact with the support.

According to a varient of this embodiment the first layer constitutes the support of the said counter-electrode.

According to a second embodiment of the counter-electrode of the cell according to the invention the primary and the electricity conducting material are associated in the counter-electrode in the form of an alloy layer, preferably disposed on a support made from an electrically insulating material.

The invention also relates to a method for preventing a metal impoverishment in certain areas of the counter-electrode of an electrolytic display cell comprising an electrolyte inserted between an electrode of shape suitable for display purposes and a continuous counter-electrode made from a metal which participates in the realisation of the display, wherein with the counter-electrode metal is associated an electricity conducting material in such a way that the metal remains in contact with the electrolyte and the electricity conducting material forms a continuous film supporting the said metal.

DESCRIPTION OF THE DRAWING AND PREFERRED EMBODIMENTS

The invention will be better understood from reading the following description which illustrates but does not limit the invention, with reference to the attached drawing which shows in vertical sectional form an embodiment of an electrolytic display cell according to the invention.

From the drawing it can be seen that the electrolytic display cell 1 comprises an electrolyte 3 inserted between two walls 5 and 7 respectively supporting an electrode 9 and a counter-electrode 11.

Electrode 9, which has a shape suitable for display purposes (points, segments, etc.) comprises in the present embodiment a number of conducting parts (active parts), whereof only one is shown in the drawing. These conducting parts are electrically insulated with respect to one another by means of an electrical insulent 10 and they can be individually supplied with electric power from a voltage source which can be connected to the counter-electrode 11.

In the drawing it can be seen that the counter-electrode 11 is continuous and extends over the entire surface area of wall 7, whilst the active parts of electrode 9 occupy a much smaller surface area of wall 5.

The active part of electrode 9, which can be seen in this drawing, and the counter-electrode 11 are connected to a voltage source 13 via a switch 15 which is able to apply a continuous potential difference in one or other direction depending on the position of switch 15 between said part of electrode 9 and counter-electrode 11. Shims 17 are inserted between electrode 9 and counter-electrode 11 in order to give an appropriate thickness to the electrolyte.

It is pointed out that the other active parts of electrode 9 are also connected to the voltage source 13 by appropriate means in such a way as to permit the application of a continuous potential difference in one or other direction between one or more parts of electrode 9 and counter-electrode 11.

According to the invention counter-electrode 11 is made from a metal and another electricity conducting material which, in the present embodiment, are associated in the form of two superimposed layers constituted respectively by a layer 11a of electricity conducting material, which is chemically and electrochemically inert under the operating conditions of the cell, and a second layer 11b of the metal participating in the electrochemical reaction.

The first layer 11a, which is in contact with wall 7 is made for example from platinum and layer 11b which is in contact with the electrolyte is made from silver.

With a counter-electrode of this type electrolyte 3 is advantageously constituted by a silver salt, such as silver iodide or bromide, optionally mixed with a support salt such as alkali metal bromide or iodide dissolved in an organic solvent, such as a mixture of acetonitrile and methyl alcohol. It is pointed out that electrode 9 can be formed by a transparent conductive oxide such as $In_2O_3$ or $SnO_2$, that the supporting walls 5 and 7 of the electrodes advantageously comprise sheets of glass and that the shims 17 are made from glass.

As in all cells of this type a symbol is displayed on the transparent electrode 9 by connecting certain parts of the latter to the negative pole of the voltage supply 13 so as to obtain a silver deposit 20 of an appropriate thickness, e.g. below 10 nm, on those parts of the electrode having the shape of the symbol to be displayed. It is pointed out that the latter can be observed from the outside on illuminating the cell by means of a light source 21, because the sliver layer deposited has characteristics such that a large part of the light is absorbed. In this case, in order to improve contrast, it is possible to mask the counter-electrode by any appropriate means, e.g. by placing a porous screen in front of the counter-electrode. However, the displayed symbol can also be observed from the outside by reflecting the light on the silver layer.

The displayed symbol can then be erased by reversing the position of switch 15 in order to connect the parts of electrode 9 coated with the silver deposit 20 to the positive pole of the voltage supply 13 in such a way as to ensure the dissolving of the silver deposit 20 previously formed on the corresponding parts of electrode 9.

During these display and erasure operations the metal of layer 11b participates in the electrochemical reaction by being dissolved during the display and then redeposited on the counter-electrode during erasure.

As a result of the presence of the conducting layer 11a the metal impoverishment of layer 11b, which may even lead to the total disappearance of the latter in certain parts of the counter-electrode, does not disturb the operation of the cell during erasure because, as there has been no interruption in the electric contact, an equilibrium profile is obtained by having the possibility of redepositing metal on these parts during the subsequent erasure operations.

Moreover, an electrolytic display cell having a counter-electrode of this type can function for a period corresponding to more than $10^7$ cycles without any deterioration in the appearance of the display, whereas the service life of a cell having a counter-electrode constituted by a silver film of thickness $50\mu$ is approximately $10^5$ cycles.

Moreover, it should be noted that the advantages obtained through the presence of the conducting layer 11a of inert material can be achieved with a very limited material thickness thereof, e.g. of the order of 1000 Å, which makes it possible to limit the cost of the cell.

Although the drawing shows a counter-electrode having two superimposed cells arranged on a support it is pointed out that according to the invention counter-electrode 11 need not be placed on a supporting wall of electrically insulating material and in this case the first layer 11a of inert electricity conducting material has an adequate thickness to function as a support for the metal layer 11b. Furthermore, according to the invention, it is also possible to associate the metal participating in the deposit and the inert material by intimately mixing them in a single layer preferably arranged on an insulating support, for example in the form of an alloy layer of the metal and the inert material.

In the embodiment shown in the drawing the first platinum layer advantageously has a thickness of 1,000 to 2,000 Å and the silver layer a thickness of 5 to 10 microns.

A counter-electrode of this type can be produced by any known method and in particular by vacuum deposition and screen process printing methods.

For example the counter-electrode 11 can be produced in the following way. A 1,000 to 2,000 Å thick platinum film is deposited by cathodic sputtering on a sheet of glass constituting wall 7 which serves as a support for the counter-electrode, the deposition time lasting about 3 to 5 minutes. A 5 to 10 micron thick silver film is then deposited on the platinum film by screen process printing, followed by silver annealing in accordance with conventional methods.

In the same way the silver film can be deposited by cathodic sputtering or evaporation, which makes it possible to form a very thin film, for example of the order of 1,000 Å.

The invention is not limited to the embodiments described and represented hereinbefore and various modifications can be made thereto without passing beyond the scope of the invention.

What is claimed is:

1. An electrolytic display cell comprising a transparent electrode of a shape suitable for display purposes, a counter-electrode of greater surface area oppositely disposed with respect to said transparent electrode and comprising a supporting member having deposited thereon a first continuous layer of an electrically conductive metal chemically and electrochemically inert with respect to an electrolyte to be used in the cell under the operating conditions thereof, and an outer continuous layer of a primary metal to be deposited on said transparent electrode and in contact with said electrolyte; an electrolyte disposed between said electrodes to facilitate transfer of said primary metal from said counter-electrode to said transparent electrode and redeposition thereof on said counter-electrode; and means for supplying said electrodes with power to deposit on or dissolve from preselected parts of said transparent electrode a coating of said primary metal.

2. A cell according to claim 1, wherein the first layer constitutes the support for the counter-electrode.

3. A cell according to claim 1, wherein the layers are placed on a support of electrically insulating material, the said layer being in contact with the support.

4. A cell according to claim 1, wherein the electrically conductive metal is a secondary metal having an oxidation reduction potential greater than that of the primary metal.

5. A cell according to claim 4, wherein the secondary metal is chosen from the group consisting of palladium, gold and platinum.

6. A cell according to claim 1, wherein the primary metal is silver.

7. An electrolytic display cell comprising a transparent electrode of a shape suitable for display purposes; a counter-electrode of greater surface area oppositely disposed with respect to said transparent electrode and comprising a supporting member having deposited thereon a continuous layer of an alloy of an electrically conductive metal chemically and electrochemically inert with respect to an electrolyte to be used in the cell under the operating conditions thereof and a primary metal to be deposited on said transparent electrode; an electrolyte disposed between said electrodes to facilitate transfer of said primary metal from said counter-electrode to said transparent electrode and redeposition thereof on said counter-electrode; and means for supplying said electrodes with power to deposit on or dissolve from preselected parts of said transparent electrode a coating of said primary metal.

8. A cell according to claim 7, wherein the alloy layer is placed on a support of electrically insulating material.

* * * * *

UNITED STATES PATENT OFFICE
CERTIFICATE OF CORRECTION

Patent No. 4,283,121                    Dated  August 11, 1981

Inventor(s)   ROBERT MEYER

It is certified that error appears in the above-identified patent and that said Letters Patent are hereby corrected as shown below:

On the Title page, Item [73], Assignee should read:

COMMISSARIAT A L'ENERGIE ATOMIQUE

Signed and Sealed this

Twelfth Day of January 1982

[SEAL]

Attest:

Attesting Officer

GERALD J. MOSSINGHOFF
Commissioner of Patents and Trademarks